B. E. COLE.
Baling-Presses.
No. 146,318. Patented Jan. 13, 1874.
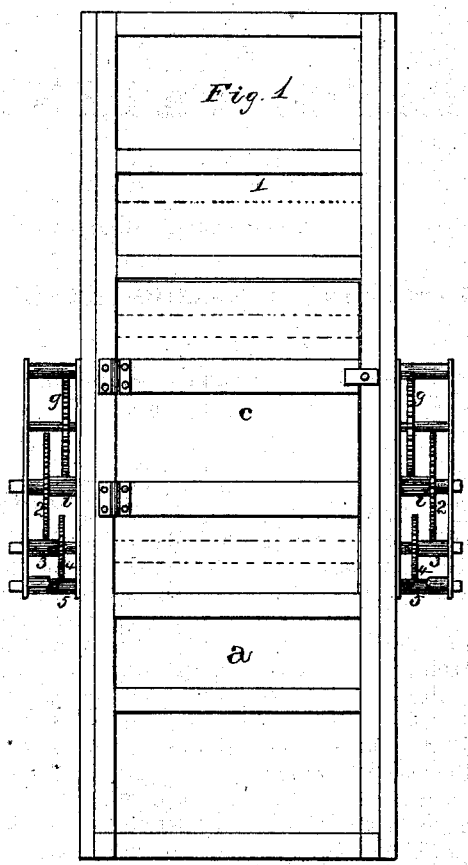
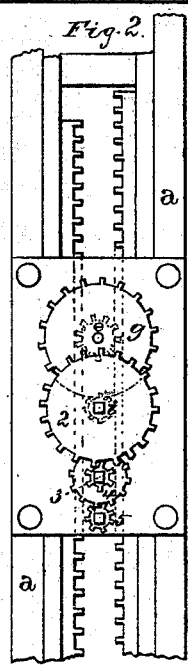
WITNESSES.
W. H. Duhamel
Alex Davidson.
INVENTOR.
Buel E. Cole
Per H. S. Abbot.
Attorney.

UNITED STATES PATENT OFFICE.

BUEL E. COLE, OF PITTSFIELD, MASSACHUSETTS.

IMPROVEMENT IN BALING-PRESSES.

Specification forming part of Letters Patent No. 146,318, dated January 13, 1874; application filed June 19, 1873.

*To all whom it may concern:*

Be it known that I, BUEL E. COLE, of Pittsfield, county of Berkshire and State of Massachusetts, have invented certain new and useful Improvements in Presses, of which the following is a specification:

The nature of my invention relates to an improvement in hay and cotton presses; and it consists in operating the followers by two rack-bars and pinions at each end, the pinions being operated by a series of gear-wheels, which are so arranged that the power applied may be eased at pleasure.

Figure 1 represents a side elevation of my press. Fig. 2 is an end view of the same.

*a* represents the frame, of any desired shape or size, and which has an opening, 1, in one side, at the top, through which the hay, cotton, or other material is thrown into the press to be baled, and a door, *c*, in the center, through which the bale is removed. Each follower has a rack-bar secured to each end, with which a pinion, *e*, gears, so that when the pinion is revolved the two followers will either be moved toward or from each other, as may be desired. Secured to the shaft of the pinion *e* is a gear-wheel, *g*, which meshes with a pinion on the shaft *i*, on which is a second wheel, 2, which meshes with a pinion on the shaft 3, on which is a third wheel, 4, which meshes with a pinion, 5. By applying the cranks to the shafts *i* at each end of the frame, the followers will be moved with any desired speed, but when it is desired to apply the power more easily the cranks are changed to the shafts 3, and if it is desired to apply it still more easily the cranks are changed to the pinions 5, the power increasing with each remove.

The followers and sides of the press are slotted in the usual manner, so as to allow the bale to be tied after it has been sufficiently compressed. This press may be used for baling articles of all kinds, such as hay, straw, cotton, cloth, &c.

Having thus described my invention, what I claim as new, and desire to secure by Letters Patent, is—

The combination of the followers, rack-bars, and pinions *e*, arranged and operating substantially as set forth, so that the revolution of the pinion *e* causes the upper and lower follower to approach each other or to separate.

In testimony that I claim the foregoing as my invention I hereunto affix my signature.

BUEL E. COLE.

Witnesses:
 CLARA FLINT,
 WILLIAM T. FILLEY.